Patented Dec. 25, 1923.

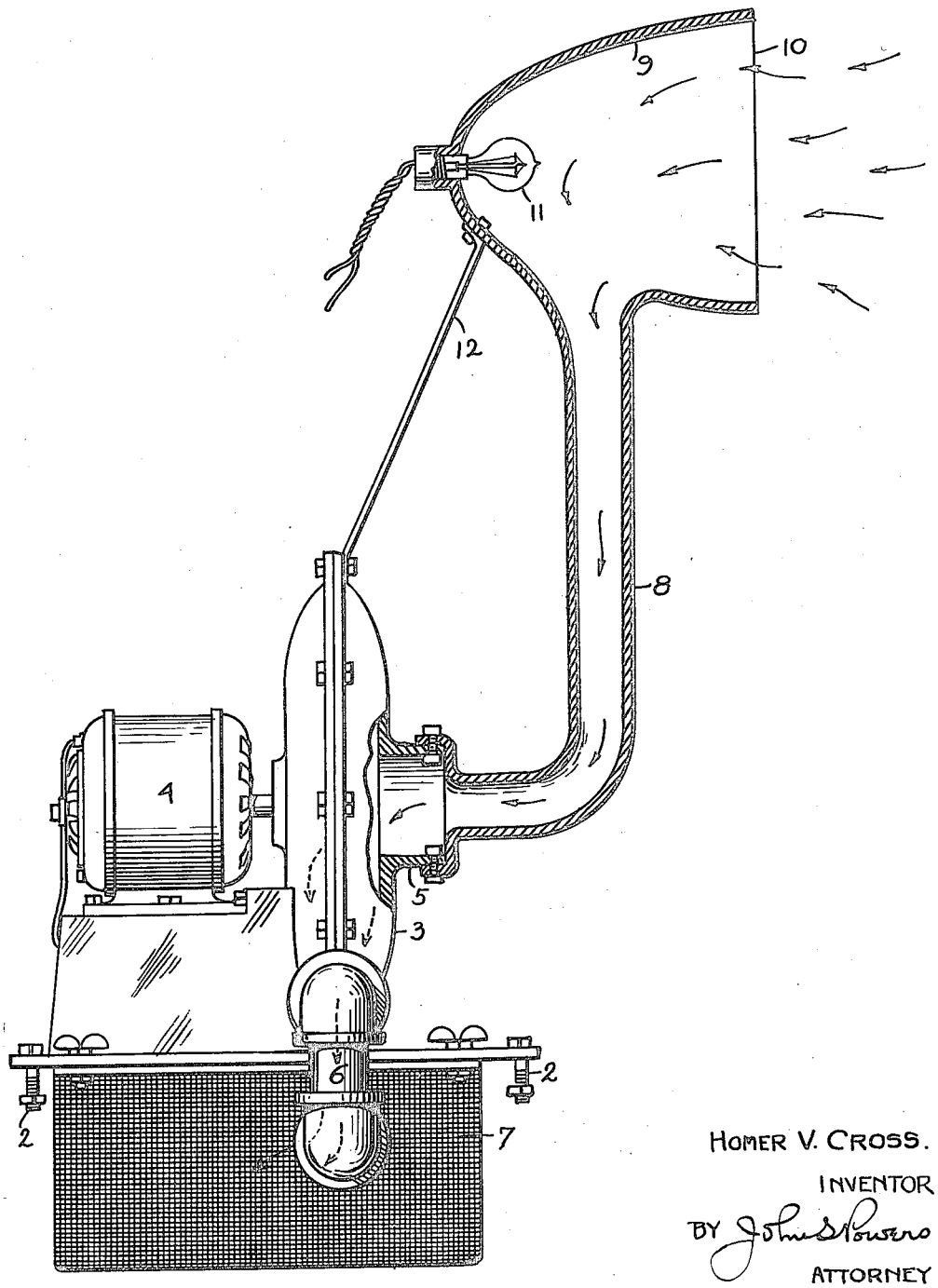

1,478,424

UNITED STATES PATENT OFFICE.

HOMER V. CROSS, OF KENTON, TENNESSEE, ASSIGNOR OF ONE-HALF TO CLIFFORD W. WORDEN, OF BUFFALO, NEW YORK.

INSECT EXTERMINATOR.

Application filed December 16, 1921. Serial No. 522,795.

*To all whom it may concern:*

Be it known that I, HOMER V. CROSS, a citizen of the United States, residing at Kenton, in the county of Obion and State of Tennessee, have invented certain new and useful Improvements in Insect Exterminators, of which the following is a specification.

This invention relates to improvements in insect exterminators, proposing a device which is especially useful for the destruction of the boll weevil but which may also be used with great advantage for the destruction of other flying insect pests.

The construction proposed is of the broad or general type wherein a lamp is employed for the purpose of attracting the insects toward the inlet of a suction trunk through which the insects are carried to a suitable receiver by a strong current of air flowing in the trunk.

The invention consists particularly in the novel form of the suction trunk and the novel arrangement of the lamp in relation to said trunk, the objects in view being to provide brilliant and widespread reflection of the light of the lamp, to insure that all insects, when at certain points remote from the lamp, shall come within the influence of the strong air current flowing through the suction pipe, to locate the lamp substantially beyond the path of the air current whereby insects or insect matter will not become deposited upon the bulb of the lamp, thus insuring the uniform brilliancy of the illumination, and to insure that substantially all insects passing into the mouth of the trunk shall ultimately pass into the trunk. Further objects are to provide a device of simple and inexpensive construction and which may be relatively small in size while having relatively large insect receiving capacity.

The structural features of the invention will be set forth in detail as the description proceeds and are illustrated in the accompanying drawing, the single figure of which is a vertical longitudinal sectional view of a preferred emobdiment.

The device is intended to be arranged at any desired location in the field or other area to be served and in the embodiment shown includes a plate 1 as the support for the operating parts, said plate being provided with bolt and nut fastenings 2 by which the device may be mounted upon any suitable supporting structure. The device includes a suction fan 3 of any suitable construction and which is operated by an electric motor 4, the fan and motor being suitably mounted on the plate 1. The fan 3 has an inlet connection 5 and an outlet pipe 6, the latter discharging into a receptacle 7 of wire mesh or other suitable open material which will trap the insects without obstructing the air currents. In the construction shown the receptacle 7 is secured to the under face of the plate 1 but it may, of course, be arranged as desired.

The fan 3 induces a current of air through a suction trunk 8 which is joined at its lower end to the inlet connection 5. According to the invention the trunk 8 is vertically arranged, extending in upright relation from the inlet 5, and at its upper end is provided with a laterally arranged bell 9 which has the general shape of a parabolic reflector and provides an enlarged inlet mouth 10. The trunk 8 is open to the lower side of the bell, the communicating opening being intermediate the closed end of the bell and the mouth 10. The bell 9 also cooperates as a reflector with a lamp 11, preferably an electric lamp, which is disposed axially of said bell and is fitted in the closed end thereof, said lamp preferably being arranged beyond, that is to say back of, the opening through which the bell communicates with the trunk 8 and the closed end of said bell providing a concave reflector for the lamp. The bell 9 is preferably braced to the casing of the fan 3 or other suitable part by a bar 12.

From the foregoing description it will be noted that the bell 9 serves a dual function, that is to say it cooperates with the lamp 10 as a reflector and with the trunk 8 as an insect receiving and directing device. For the purpose of a reflector said bell may be given any suitable reflecting finish and in such function it distributes the rays of light over a large area and with good illuminating effect. The air current induced by the fan 3 enters the bell 9 through the mouth 10 in the same direction in which the insects, attracted by the lamp 11, fly into said bell. At the mouth 10 or slightly in advance of said mouth the insects are caught up by the flowing air stream and carried with and by it into the trunk 8, and thence through the outlet pipe 6 to the receptacle 7. As noted, the lamp 11 is preferably located back of the trunk and by such location is substantially beyond the path of the air stream whereby insects or insect matter will not become deposited on said lamp in a normal period of use and the brilliance of the illumination will not be reduced and further whereby the path of the air stream and insects through the bell to the trunk 8 is unobstructed. The closed portion of the bell has a pronounced and regular slope to the communicating opening between the bell and the trunk whereby any insects which may fall upon the reflecting surface below the lamp will gradually slide or be drawn into the trunk. The bell 9 has relatively large receiving capacity for flying insects and functioning also as a reflector causes the attraction of the insects in maximum degree and number while the form of said bell and its relation to the trunk 8 and lamp 11 are such that substantially all of the insects which are drawn into the mouth 10 will pass into the trunk 8.

The device is relatively light and compact in construction so that it may readily be moved from one point to another as occasion may require.

Having fully described my invention, I claim:

1. In an insect exterminator, in combination, a horizontally disposed insect collecting bell in the general shape of a parabolic reflector having a closed end and an enlarged mouth, a lamp mounted in line with the axis of said bell adjacent said closed end and for which said end provides a concave reflector, a vertical air trunk in open communication with said bell and connected to the lower side thereof, the communicating opening being located between said lamp and said enlarged mouth, said lamp being thereby located back of said opening, and means for inducing a descending current of air through said trunk.

2. In an insect exterminator, a vertical air trunk formed at its lower end for detachable connection to the suction side of an air pump and provided at its upper end with a horizontally disposed insect collecting bell, said bell being in the general shape of a parabolic reflector and having a closed end and an enlarged mouth and said trunk being connected to the lower side of said bell with its communicating opening located between said closed end and said mouth, and a lamp mounted in line with the axis of said bell adjacent said closed end and for which said closed end provides a concave reflector, said lamp being located back of the communicating opening of said bell and said air trunk.

In testimony whereof I affix my signature.

HOMER V. CROSS.